March 21, 1944.  F. B. HALFORD ET AL  2,344,547
APPARATUS FOR THE CONTROL OF MECHANISM
Filed Sept. 14, 1942  2 Sheets-Sheet 1

INVENTORS
F. B. HALFORD.
P. J. WALLACE
BY
ATTORNEYS

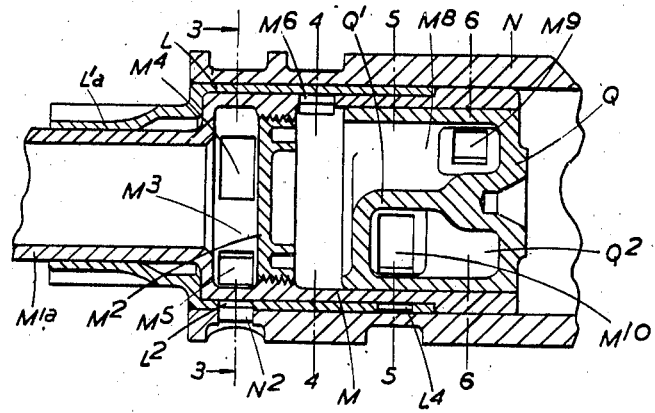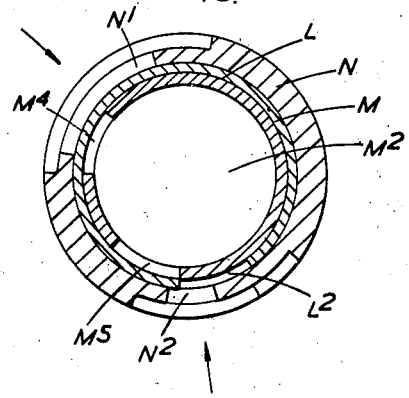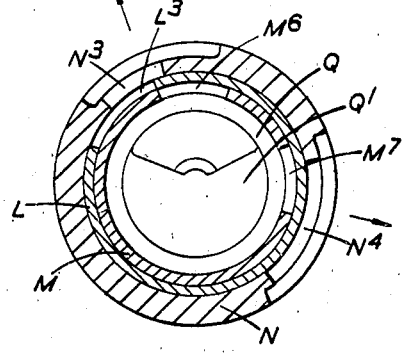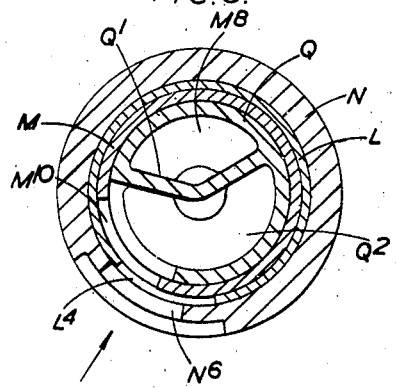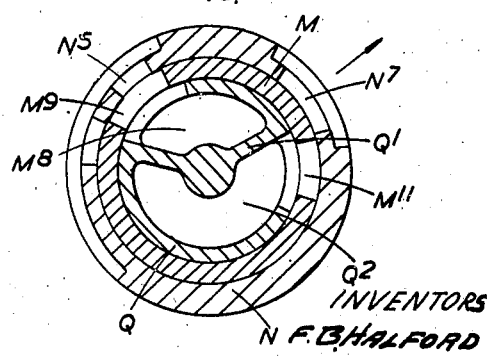

Patented Mar. 21, 1944

2,344,547

UNITED STATES PATENT OFFICE 2,344,547

APPARATUS FOR THE CONTROL OF MECHANISM

Frank Bernard Halford, Edgware, and Percy John Wallace, Harrow Weald, England, assignors to D. Napier & Son Limited, London, England, a company of Great Britain Application September 14, 1942, Serial No. 458,276
In Great Britain October 13, 1941

18 Claims. (Cl. 121—41)

This invention relates to apparatus for the control of mechanism and has for its object to effect such control through at least one pressure-actuated servomotor device in accordance with fluid pressure fluctuations to which a pressure-sensitive capsule is subjected.

According to this invention a pressure-sensitive capsule is connected to and moves a valve controlling the flow of pressure fluid to a servomotor device, and with this capsule and the valve moved thereby there is combined a member which is movable independently of but in relation to that servomotor valve this member having in it the ports which are controlled by that valve, means for moving this ported member and thus setting the servomotor and determining the datum of its operation, two valves which cooperate and together control the flow of pressure fluid to and thus the operation of some mechanism, means for moving one of these valves by the said servomotor, and means for moving the second of these valves in association with the means by which is moved the said ported member of the servomotor valve. Preferably the capsule has a constant action determined only by variations in the fluid pressure to which the capsule is subjected, it may however be adjusted for an initial setting, but when so adjusted its action will remain constant. It is convenient to employ a piston valve to control the flow of pressure fluid to the servomotor and this piston valve lies within a sleeve in which are the ports controlled by the valve the sleeve being movable independently of and in relation to the valve within it. Two concentric valves, formed for example as sleeves, may be used to control by means of ports in the walls of these sleeves the flow of pressure fluid to and thus the operation of some mechanism. While the one of these concentric valves is moved by the servomotor the other one of these two valves is moved by means associated, as for example through gearing or other mechanism, with the means, which may comprise a hand lever, by which is moved the ported sleeve of the servomotor valve. When as a result of changes in the pressure operative on the capsule and the consequent movements of the servomotor valve the piston of the servomotor has moved through a determined distance, continued movement of that piston in the same direction will cause it to move the ported sleeve or other member which cooperates with the servomotor valve, and through this ported member or in association with it there will then be imparted movement to the second of the two concentric or similarly cooperating valves.

In this way various types of mechanism may be controlled, the control in each case being effected on the one hand by the variations in fluid pressure operative on the capsule, and on the other hand by other means such as a hand lever or the like. Thus by this hand lever there can be set the datum of the servomotor by adjusting the ported sleeve or the like which determines the effective operative movements of the capsule actuated valve, such movements controlling the flow of pressure fluid to the servomotor cylinder. At the same time the hand lever effects a setting of the one valve, conveniently referred to as the second of the two concentric or otherwise cooperating valves, which control the flow of pressure fluid to the mechanism in question. In accordance with this setting so will the nature or datum of that control be determined which is effected by the movements of the first of the two cooperating valves, this first valve being actuated by the servomotor piston.

The mechanism to be thus controlled may be actuated directly by fluid under pressure the flow of which is controlled by the two cooperating valves, or these valves may control a servomotor device which in turn effects or regulates the operation of the mechanism.

The control mechanism may be employed for various purposes. What may be said to be its primary use is in aircraft where the capsule is subjected to variations in gaseous pressure. This pressure may either be the direct pressure of the atmosphere with its variations in accordance with altitude, or the capsule may be disposed in the induction manifold where it will be subjected to variations in what is ordinarily referred to as the boost pressure. When so used the arrangement may be employed for the control of mechanism by means of which a gear change may be effected in the drive through which power is transmitted to the blower constituting the supercharger of the aircraft engine.

Alternatively, the apparatus may be used in controlling the flow of fluid under pressure in the case where this fluid is used under a pressure which must be maintained within certain defined limits.

The construction and type of pressure-sensitive capsule that is used may vary and be determined by the particular use to which the improved control apparatus is put. The servomotor valve may be actuated directly or indirectly by this capsule in such a manner as may be convenient.

The accompanying drawings illustrate by way of example how the invention may be carried out when arranged for instance for controlling the change gear through which is driven the supercharging blower of an aircraft engine. In these drawings—

Figure 2 is a longitudinal sectional elevation of the duplex concentric cooperating sleeve valves on a larger scale.

Figure 1:
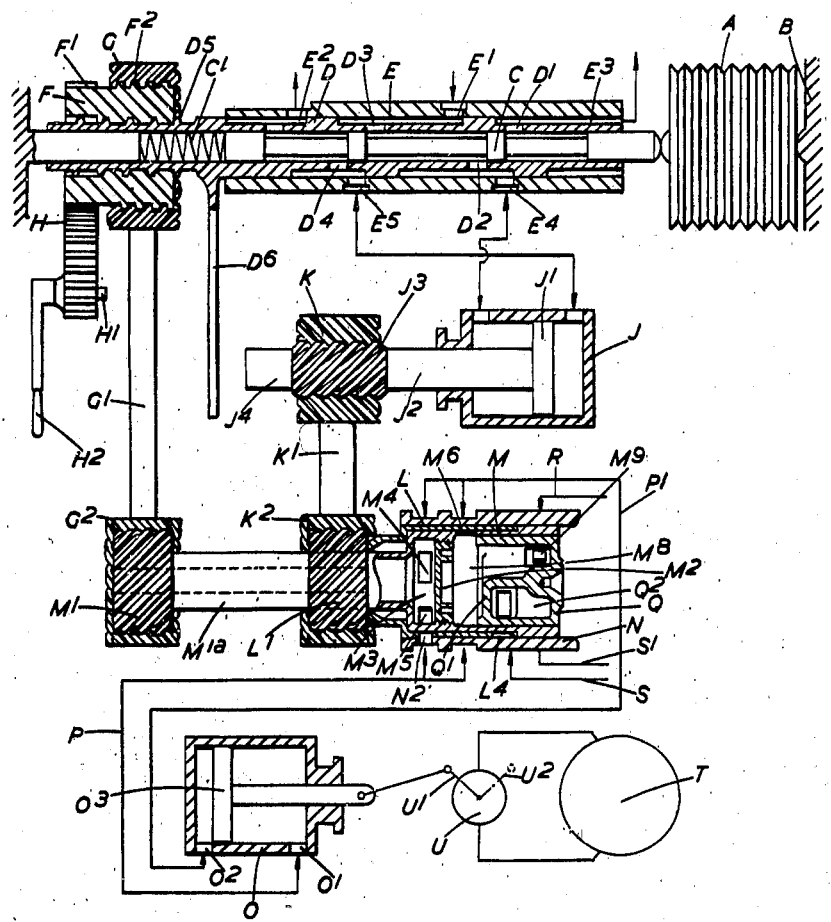
Figure 1 is a diagrammatic view of the control apparatus of which parts are shown in sectional elevation.

Figures 3, 4, 5 and 6 are transverse sections of the concentric sleeve valves as shown in Figure 2, these sections being taken respectively on the lines 3—3, 4—4, 5—5 and 6—6 in Figure 2 in each case looking in the direction of the arrows shown associated with the section line 3—3.

A pressure-sensitive capsule A, positioned in this instance where it will be subject to changes in atmospheric pressure, is disposed between a fixed part B and a piston valve C which in accordance with changes in the capsule can be caused by it to slide in the direction of its axis against the action of a spring $C^1$. Apart from means which if necessary may be provided for initial setting of the capsule A the part B against which it abuts is a fixture so that the action of the capsule is constant in respect of its changes under atmospheric changes of pressure. The valve C slides within a ported sleeve D which itself can be moved in the axial direction, but not rotated, within the fixed outer casing E. Liquid under pressure can enter the casing through the port $E^1$ therein and can drain away at $E^2$ and $E^3$. According to the longitudinal setting of the sleeve D with the ports $D^1$ and $D^2$, $D^3$ and $D^4$ therein the flow from the ports $E^4$ and $E^5$ of the pressure liquid, or its return flow to drain, is determined by the movement of the valve C. At one end the sleeve D is provided externally with a quick-pitch screwthread $D^5$ which is engaged by a rotatable nut F, the sleeve being prevented from rotation so that when the nut is turned the sleeve will be moved in the axial direction, the nut being only free to rotate.

On its exterior this nut F is formed as a toothed wheel $F^1$ and over part of it is a skew gear wheel $F^2$ which engages a corresponding wheel G on a rotatable shaft $G^1$. The toothed wheel $F^1$ meshes with a toothed quadrant H rotatable about a centre $H^1$ by a hand lever $H^2$. Thus when the lever is moved it will turn the nut F and cause the sleeve D to move longitudinally and at the same time the shaft $G^1$ will be turned.

The valve C controls the flow of pressure liquid to the cylinder J of a servomotor whose piston $J^1$ has on its rod $J^2$, which cannot rotate about its axis, a skew gear wheel $J^3$ which meshes with a corresponding wheel K on a shaft $K^1$. When the piston $J^1$ has moved a determined distance the end $J^4$ of its rod will come into contact with a projection $D^6$ carried by the sleeve D and any further movement in that direction of the piston $J^1$ will cause longitudinal movement to be given to the sleeve D. This movement will rotate the nut F on the sleeve D and through the nut rotation will be imparted to the shaft $G^1$. The ports $E^4$ and $E^5$ in the valve casing E communicate with the opposite ends of the servomotor cylinder J.

Two concentric and cooperating valves L and M formed as sleeves are rotatable relatively and also with respect to the fixed casing N. The outer sleeve valve L is connected to a skew gear wheel $L^1$ through a shaft $L^{1a}$ and this wheel meshes with a corresponding wheel $K^2$ on the shaft $K^1$. Similarly the inner sleeve valve M is connected to a skew gear wheel $M^1$ on a hollow shaft $M^{1a}$ and this wheel meshes with a corresponding wheel $G^2$ on the shaft $G^1$. Thus when the piston J of the servomotor moves and in so doing turns the wheel K it will rotate the sleeve valve L within the casing N. When movement of the hand lever $H^2$ rotates the nut F and causes the shaft $G^1$ to be turned the inner sleeve valve M will be rotated within the outer valve L. Rotation of this inner valve M will also take place when the piston $J^1$ of the servomotor has moved so far as to pick up the projection $D^6$ and move the ported sleeve D which will then turn the nut F.

The sleeve valves L and M together control the flow of pressure liquid to and its drain from the cylinder O of another servomotor. This pressure liquid can flow into and pass from the casing N through ports therein suitably situated around this casing and with relation to the ports in the outer sleeve valve L with which the ports in the inner sleeve M cooperate. Within the inner sleeve valve M is a transverse partition $M^2$ which separates off a chamber $M^3$ open to the hollow shaft $M^{1a}$. Through this hollow shaft the liquid can drain away when admitted to the chamber $M^3$ by the appropriate setting of the valves L and M, this liquid having come from the servomotor cylinder O. In the part of the sleeve valve M which surrounds this chamber $M^3$ there are ports $M^4$ and $M^5$ which can be brought alternatively into register, by relative rotation of the valves L and M, with the port $L^2$ in the part of the sleeve valve L which surrounds this part of the valve M. These ports can cooperate with either the port $N^1$ (see Figure 3) or the port $N^2$ in the casing N, these ports being in communication by piping P and $P^1$ with ports $O^1$ and $O^2$ in the servo cylinder O. Through these ports and piping the pressure liquid can flow away from each end of the cylinder O and permit movement of the piston $O^3$ in that cylinder when liquid under pressure is admitted to the opposite side of the piston.

Referring to the section shown in Figure 4, it will be seen that in this part of the sleeve valve M there are two ports $M^6$ and $M^7$ and either of these may be brought into register with a single port $L^3$ in the outer sleeve valve L. By suitable rotation of these valves these cooperating ports may be brought into register with the port $N^3$ or the port $N^4$ in the casing N. Of these the port $N^3$ communicates by the piping $P^1$ with the port $O^2$ in the servo cylinder O and by this means pressure liquid from within the sleeve valve M can enter the cylinder O and cause the piston $O^3$ therein to move to the right as seen in Figure 1. At this time the relative positions of the sleeve valves M and L will be such that the drain ports $M^5$, $L^2$ and $N^2$ will all be in register so that pressure liquid can flow away from the other side of the piston $O^3$ through the port $O^1$ into chamber $M^3$ and thence through the hollow shaft $M^{1a}$. The port $N^4$ in the casing N communicates by the piping P with the port $O^1$ in the servo cylinder O and therefore when the ports $M^7$ and $L^3$ are in register and also with this port $N^4$ pressure liquid can flow through the port $O^1$ into the cylinder O and move the piston $O^3$ to the left. This is possible since at this time the ports $M^4$ and $L^2$ will be in register and also with the port $N^1$ in the casing thus permitting the pressure liquid from the left hand side of the piston $O^3$ to flow away into the chamber $M^3$ in the sleeve valve M and thence through the hollow shaft $M^{1a}$.

The chamber $M^8$ formed within the main part of the sleeve valve M is closed by a plug Q in which is a partition $Q^1$ separating off a chamber $Q^2$. Into the chamber $M^8$ liquid under pressure can enter from a pipe R through a port $N^5$ in the casing and a port $M^9$ in the valve M when these ports are in register. The port $M^9$ leads from a corresponding opening in the wall of the plug Q. If desired the supply of this pressure liquid may be separately controlled in some convenient way. Pressure liquid can enter the chamber $Q^2$ from a pipe S, port $N^6$ in the casing, port $L^4$ in the sleeve valve L and port $M^{10}$ in the valve M, and this liquid can flow from this chamber through a port $M^{11}$ and port $N^7$ by way of a pipe $S^1$. It will be seen that at this end the wall of the sleeve valve M is thickened to lie against the interior of the casing N since the sleeve valve L is of less length than the valve M. The pressure liquid which is permitted to flow through the chamber $Q^2$ and is thus controlled by the valve L and M may be employed for some suitable purpose which is not concerned with the present invention.

As mentioned the invention is here arranged and shown diagrammatically as employed to control a change speed gear in the drive for a supercharger blower or other purpose. The change gear is represented at T and is adapted to be controlled hydraulically by means of a cock U actuated by a lever which can be moved between the two positions $U^1$ and $U^2$ by the servo piston $O^3$.

An important feature in the control apparatus is the arrangement mentioned above whereby when the servo piston $J^1$ has moved a certain distance the end $J^4$ of its rod will come into contact with the projection $D^6$ carried by the ported sleeve D which will then be moved by continued movement of the piston $J^1$. Such movement of this servo piston, in addition to rotating the outer sleeve valve L through the skew gears $J^3$, K, shaft $K^1$ and gears $K^2$, $L^1$, will also cause a rotation of the inner sleeve valve M as a result of the longitudinal movement of the ported sleve D rotating the member F and thus transmitting rotation through the skew gears $F^2$, G, shaft $G^1$ and gears $G^2$, $M^1$. Where this apparatus is used on an aircraft as indicated and if so used in association with boost control, this feature results in the apparatus having a follow-up action under certain conditions when fall of boost occurs.

In order to have a clearer understanding of the present invention, the following describes the consecutive motions of the mechanism shown and described as applied to the control of an aircraft engine, for example, incorporating a two-speed drive to the supercharger.

*Operation of boost control*

When the engine is at rest on the ground, the capsule A will be at its normal "atmospheric length"; the valve C will be in contact with the capsule by virtue of the spring $C^1$, while the sleeve D will be at the extreme left-hand limit of its travel as viewed in Fig. 1. With these positions obtaining the engine will be started.

Preparatory to taking-off, the pilot will move his control lever $H^2$ to the take-off position in order to obtain maximum engine power. The effect of this will be to rotate the gear F, which through its internal worm thread will move the sleeve D to the right, thus opening the port $D^4$, so that it may receive high pressure oil from the ports $D^3$ and $E^1$; thus permitting the oil to flow through port $E^5$ along the pipeline communicating with the right hand end of the boost cylinder J. This will cause the engine boost pressure to increase, and this pressure in turn will cause the capsule A to contract to the length corresponding to the boost pressure. The spring $C^1$ will cause the valve C to follow up the capsule until, when the actual boost pressure equals the datum boost called for by the pilot, and applicable to the take-off condition, the lands on the valve will close both the ports $D^2$ and $D^4$ (from the position in which valve and sleeve are shown in Fig. 1).

For the moment, only the action of the boost control parts is being described, the accompanying motion of the gear change mechanism will be described later.

So long as the aircraft continues to fly at the same altitude (namely substantially sea level) and with the pilot's control lever in the take-off position, the capsule, valve and sleeve will retain constant positions as already described.

Actually the aircraft will proceed to climb and the consequent increase of altitude will result in a fall of engine boost pressure due to the decreasing density of the atmosphere. This will cause expansion of the capsule, with accompanying movement of the valve C against the action of the spring $C^1$, thus causing the port $D^4$ to reopen to the pressure oil line resulting in further movement of the boost piston $J^1$ to the left. The valve C will then again be holding closed both of the ports $D^2$ and $D^4$ in communication with the cylinder.

Successive increases of altitude will cause this sequence of operations to repeat until the piston $J^1$ has moved to the left and with consequent diminution of atmospheric density, will result in a corresponding fall of engine boost pressure with accompanying expansion of the capsule. But at this point it is arranged that the piston rod $J^4$ shall make contact with the arm $D^6$, so that further movement of the piston to the left is accompanied by equal and similar movement of the sleeve D, until such time as the lands on the valve C have covered the port $D^4$, and thus restored stable conditions. This means that above the "critical altitude" (that is the altitude above which the engine cannot maintain a given datum boost) expansion of the capsule A is accompanied by an equal motion of the piston $J^1$, that is the piston $J^1$, when the critical altitude has a motion proportional to the fall of boost below the datum.

It is desired that the change speed mechanism in the supercharger drive shall change gear at such an altitude as is associated with a particular fall of boost pressure below the datum boost, and it is upon this principle that the mechanism, herein described, is arranged to operate.

*Operation of supercharger gear change for change-up*

It has already been pointed out that when the pilot moves his control lever to select any particular datum boost there follows a rotation of the gear F which causes the sleeve L to slide. Simultaneously, the gear F transmits through the gear G, the shaft $G^1$ and the gears $G^2$ and $M^1$ and thus to the boost sleeve M. As viewed in the cross sections of Fig. 2, we may regard this motion of the sleeve M as being in a clockwise direction for increase of datum boost. The helix angle of the gear teeth F2 is so chosen that subsequent sliding of the sleeve D above critical altitude will, through the connecting elements G1, G2, M1 and M1a, cause the sleeve M to travel back in an anti-clockwise direction by an amount proportional to the fall of boost below the datum. Thus the angular position of the sleeve M is, at all times, a measure of the actual boost pressure obtaining in the engine manifolds. Therefore, when flying at a given datum boost there will exist for any given fall of boost a definite angular position for the sleeve M.

Similarly, the sleeve L is caused to rotate in response to sliding of the piston J1, by virtue of the connecting elements J3, K, K1, K2 and L1. It is so arranged that movement of the piston to the left, that is, while the throttle is being opened, causes the sleeve L to rotate in a clockwise direction, and at the "critical altitude" condition (that is, full throttle) the sleeve L will occupy a definite angular position, while further movement of the piston J, due to fall of boost above "critical altitude," will result in the sleeve L occupying successive angular positions dependent upon the extent of fall of boost below datum; or, what amounts to the same thing, there will exist an angular displacement beyond the full throttle position proportional to the fall of boost below the datum.

The fall of boost at which gear change should take place being known, the ports M6 and L3 are formed respectively in the sleeves M and L at such angular positions that they actually crack open at their leading edges at that predetermined fall of boost; this permits of pressure oil within the sleeve M passing through the ports M6, L3 and N3 to the port O2 in the gear change cylinder O, thus moving the piston O3 to the right, and so operating the gear change lever on the supercharger drive. Pressure oil is arranged to be fed to the sleeve M through the ports N5, M9 and M8, in those positions of the sleeves M and N where the gear changes occur.

*Operation for change-down*

After continuing to climb, the aircraft will eventually descend to altitudes below the gear change altitude. Loss of altitude will be accompanied by the following motions.

The increasing atmospheric density will close the capsule and thus cause the valve C to move to the right, so permitting pressure oil to pass through the ports D2 and E4 to the left-hand side of the boost piston J1, which will thus move to the right and close the throttle to the extent necessary to maintain the selected datum boost. This means to say that when the supercharger drive is in high gear, the altitude may be measured by the position of the throttle sleeve L, and it is arranged that at the altitude where the change down to low gear shall occur, the port M7 cracks open with the port L3, thus allowing pressure oil to pass from within the sleeve M, through the port N4, in the fixed housing N, and the port O1 in the gear change cylinder O, thus moving the piston O3 to the left, which in turn moves the gear change lever on the supercharger drive to the low gear position.

In order to avoid instability of the mechanism at the gear change altitude, the various ports are so arranged that the "change down" into low gear occurs at a somewhat lower altitude than the "change up" into high gear with a given datum boost.

It may be observed as a matter of interest that "change down" into low gear will result in a condition where the engine is unable to maintain datum boost, so that the throttle will be moved to the fully open position through the various agencies previously described.

*Mixture control at altitude*

Reverting to the condition above gear change altitude with the aircraft continuing to climb, it will be clear that beyond the point at which datum boost can be maintained in high gear, the boost sleeve M will rotate in an anti-clockwise direction by an amount proportional to the fall of boost.

Fundamentally, in the interests of fuel economy, it is arranged that when the actual boost pressure has fallen to a low figure, the port M11 will crack open with the port N7, thus providing a supply of pressure oil to operate other mechanism to reduce the full mixture strength. In order that this mixture change may take place only at low boost pressure consequent upon high altitude, and not at similar low datum boosts selected near sea level, it is arranged that the supply of pressure oil to the port M11 can only be available when the throttle is fully open, by way of the ports M10 and L4 and N6. It will be seen that the port N6 is always held closed by the sleeve L except when the throttle is fully open.

It will be seen that with this improved control apparatus there is combined with a manual control, by which adjustment or setting may be effected, an automatic control actuated in accordance with variations in the pressure to which the pressure-sensitive capsule is subjected. This automatic control will be constant in action since it is preferred that once the capsule has been set or adjusted for general use, it shall continue in its state as thus primarily set.

What we claim as our invention and desire to secure by Letters Patent is:

1. In apparatus for the control of mechanism the combination of a pressure-sensitive capsule, a servomotor actuated by liquid under pressure, a valve controlling the flow of pressure liquid to this servomotor, means by which this valve is actuated by the said capsule, a movable member in which are the ports controlled by the said capsule-actuated valve, means for moving this ported member and thereby altering the position of the ports therein in relation to the said servomotor valve, mechanism operated by liquid under pressure, two valves which cooperate and together control the flow of pressure liquid for operating this mechanism, means for moving the first of these cooperating valves by the said servomotor, and means for moving the second of the said cooperating valves, such means being connected with the said means for moving the said ported member.

2. In apparatus for the control of mechanism the combination of a pressure-sensitive capsule, a fixed abutment with which this capsule is in contact and with respect to which the capsule movements are effected so that the capsule has a constant action determined only by variations in the pressure of the fluid medium to which the capsule is subjected, a servomotor actuated by fluid under pressure, a valve controlling the flow of pressure fluid to this servomotor, means by which this valve is actuated by the said capsule, a movable member in which are the ports controlled by the said capsule-actuated valve, means for moving this ported member and thereby altering the position of the ports therein in relation to the said valve, mechanism operated by fluid pressure, two valves which cooperate and together control the flow of pressure fluid for operating this mechanism, means for moving the first of these cooperating valves by the said servomotor, and means for moving the second of the said cooperating valves, such means being connected with the said means for moving the said ported member.

3. In apparatus for the control of mechanism the combination of a pressure sensitive capsule, a servomotor actuated by liquid under pressure, a valve controlling the flow of pressure liquid to this servomotor, means by which this valve is actuated by the said capsule, a movable member in which are the ports controlled by the said capsule-actuated valve, means for moving this ported member and thereby altering the position of the ports therein in relation to the said servomotor valve, mechanism operated by liquid under pressure, a second servomotor which actuates a valve controlling the flow of pressure liquid to this mechanism, two valves which co-operate and together control the flow of liquid under pressure which operates the said second servomotor, means for moving the first of these co-operating valves by the said first servomotor, and means for moving the second of the said co-operating valves, such means being connected with the said means for moving the said ported member.

4. In apparatus for the control of mechanism the combination of a pressure sensitive capsule, a servomotor actuated by liquid under pressure, a piston valve controlling the flow of pressure liquid to this servomotor, means by which this valve is actuated by the said capsule, a ported sleeve within which moves the said piston valve which controls the ports in this sleeve, means for moving this ported sleeve and thereby altering the position of the ports therein in relation to the said servomotor piston valve, mechanism operated by liquid under pressure, two valves which co-operate and together control the flow of pressure liquid for operating this mechanism, means for moving the first of these co-operating valves by the said servomotor, and means for moving the second of the said co-operating valves, such means being connected with the said means for moving the said ported sleeve.

5. In apparatus for the control of mechanism the combination of a pressure sensitive capsule, a servomotor actuated by liquid under pressure, a valve controlling the flow of pressure liquid to this servomotor, means by which this valve is actuated by the said capsule, a movable member in which are the ports controlled by the said capsule-actuated valve, means for moving this ported member and thereby altering the position of the ports therein in relation to the said servomotor valve, mechanism operated by liquid under pressure, two concentric sleeve valves having within them a chamber into which liquid under pressure can enter these valves co-operating and together controlling the flow of this pressure liquid to operate this mechanism, means for moving the first of these sleeve valves by the said servomotor, and means for moving the second of these co-operating sleeve valves, such means being connected with the said means for moving the said ported member.

6. In apparatus for the control of mechanism the combination of a pressure sensitive capsule, a servomotor actuated by liquid under pressure, a valve controlling the flow of pressure liquid to this servomotor, means by which this valve is actuated by the said capsule, a movable member in which are the ports controlled by the said capsule-actuated valve, a hand lever with gearing through which this ported member is moved such movement altering the position of the ports in this member in relation to the said servomotor valve, mechanism operated by liquid under pressure, two valves which co-operate and together control the flow of pressure liquid for operating this mechanism, means for moving the first of these co-operating valves by the said servomotor, and means for moving the second of the said cooperating valves through gearing from the said hand lever.

7. In apparatus for the control of mechanism the combination of a pressure-sensitive capsule, a servomotor actuated by liquid under pressure, a valve controlling the flow of pressure liquid to this servomotor, means by which this valve is actuated by the said capsule, a movable member in which are the ports controlled by the said capsule-actuated valve, means for moving this ported member and thereby altering the position of the ports therein in relation to the said servomotor valve, mechanism operated by liquid under pressure, two separately rotatable valves which cooperate and together control the flow of pressure liquid for operating this mechanism, means for rotating the first of these cooperating valves by the said servomotor, and means for rotating the second of the said cooperating valves, such means being connected with the said means for moving the said ported member.

8. In apparatus for the control of mechanism the combination of a pressure sensitive capsule, a servomotor actuated by liquid under pressure, a valve controlling the flow of pressure liquid to this servomotor, means by which this valve is actuated by the said capsule, a movable member in which are the ports controlled by the said capsule-actuated valve, means for moving this ported member and thereby altering the position of the ports therein in relation to the said servomotor valve, mechanism operated by liquid under pressure, two concentric ported sleeve valves which are separately rotatable relatively and both rotatable in relation to ports in an enclosing casing, these two valves cooperating and together controlling the flow of pressure liquid for operating the said mechanism, means for rotating the first of these cooperating valves by the said servomotor, and means for rotating the second of the said cooperating valves, such means being associated with the said means for moving the said ported member.

9. In apparatus for the control of mechanism the combination of a pressure-sensitive capsule, a servomotor actuated by liquid under pressure and comprising a cylinder and piston, a valve controlling the flow of pressure liquid to the cylinder of the servomotor, means by which this valve is actuated by the said capsule, a movable member in which are the ports controlled by the said capsule-actuated valve, means for moving this ported member and thereby altering the position of the ports therein in relation to the said servomotor valve, mechanism operated by liquid under pressure, two valves which cooperate and together control the flow of pressure liquid for operating this mechanism, means by which the first of these cooperating valves will be moved by movement of the piston of the said servomotor, means for moving the second of the said cooperating valves, such means being connected with the said means for moving the said ported member, and means by which the piston of the said servomotor if it moves beyond a determined distance will impart movement to the said ported member associated with the said capsule-actuated valve and will simultaneously impart movement to the second of the said cooperating valves.

10. In apparatus for the control of mechanism the combination of a pressure-sensitive capsule, a servomotor actuated by liquid under pressure and comprising a cylinder and piston, a valve controlling the flow of pressure liquid to the cylinder of the servomotor, means by which this valve is actuated by the said capsule, a movable member in which are the ports controlled by the said capsule-actuated valve, means for moving this ported member and thereby altering the position of the ports therein in relation to the said servomotor valve, mechanism operated by liquid under pressure, two separately rotatable valves which cooperate and together control the flow of pressure liquid for operating this mechanism, means by which the first of these cooperating valves will be rotated by movement of the piston of the said servomotor, and means for rotating the second of the said cooperating valves, such means being connected with the said means for moving the said ported member.

11. In apparatus for the control of mechanism the combination of a pressure-sensitive capsule, a fixed abutment with which this capsule is in contact and with respect to which the capsule movements are effected so that the capsule has a constant action determined only by variations in the pressure of the fluid medium to which the capsule is subjected, a servomotor actuated by fluid under pressure, a piston valve controlling the flow of pressure liquid to this servomotor, means by which this valve is actuated by the said capsule, a sleeve within which moves the said piston valve and by which ports in this sleeve are controlled, means for moving this ported sleeve and thereby altering the position of the ports therein in relation to the said servomotor piston valve, mechanism operated by liquid under pressure, a second servomotor which actuates a valve controlling the flow of pressure liquid to this mechanism, two valves which cooperate and together control the flow of liquid under pressure which operates the said second servomotor, means for moving the first of these cooperating valves by the said first servomotor, and means for moving the second of the said cooperating valves, such means being connected with the said means for moving the said ported sleeve.

12. In apparatus for the control of mechanism the combination with a pressure-sensitive capsule, a servomotor actuated by liquid under pressure, a valve controlling the flow of pressure liquid to this servomotor, means by which this valve is actuated by the said capsule, a movable member in which are the ports controlled by the said capsule-actuated valve, means for moving this ported member and thereby altering the position of the ports therein in relation to the said servomotor valve, mechanism operated by liquid under pressure, two concentric ported sleeve valves which are separately rotatable relatively and both rotatable in relation to ports in a casing around them, these valves which have within them a chamber into which liquid under pressure can enter cooperating and together controlling the flow of pressure liquid for operating said mechanism, means for rotating the first of these cooperating valves by the said servomotor, and means for rotating the second of the said cooperating valves, such means being connected with the said means for moving the said ported member.

13. In apparatus for the control of mechanism the combination of a pressure-sensitive capsule, a servomotor actuated by liquid under pressure, a valve controlling the flow of pressure liquid to this servomotor, means by which this valve is actuated by the said capsule, a movable member in which are the ports controlled by the said capsule-actuated valve, means for moving this ported member and thereby altering the position of the ports therein in relation to the said servomotor valve, mechanism operated by liquid under pressure, a second servomotor which actuates a valve controlling the flow of pressure liquid to this mechanism, two concentric sleeve valves enclosing a chamber into which liquid under pressure can enter these valves cooperating and together controlling the flow of this pressure liquid to the said second servomotor, means for moving the first of these sleeve valves by the said first servomotor, and means for moving the second of these cooperating sleeve valves, such means being connected with the said means for moving the said ported member.

14. In apparatus for the control of mechanism the combination of a pressure sensitive capsule, a fixed abutment with which this capsule is in contact and with respect to which the capsule movements are effected so that the capsule has a constant action determined only by variations in the pressure of the fluid medium to which the capsule is subjected, a servomotor actuated by liquid under pressure and comprising a cylinder and piston, a piston valve controlling the flow of pressure liquid to the cylinder of the servomotor, means by which this valve is actuated by the said capsule, a ported sleeve within which moves the said piston valve and by which the ports in this sleeve are controlled, means for moving this ported sleeve and thereby altering the position of the ports therein in relation to the said servomotor piston valve, mechanism operated by liquid under pressure, a second servomotor which actuates a valve controlling the flow of pressure liquid to this mechanism, two valves which cooperate and together control the flow of liquid under pressure which operates the said second servomotor, means by which the first of these cooperating valves will be moved by movement of the piston of the said servomotor, means for moving the second of the said cooperating valves, such means being connected with the said means for moving the said ported sleeve, and means by which the piston of the said servomotor if it moves beyond a determined distance will impart movement to the said ported sleeve and will simultaneously impart movement to the second of the said cooperating valves.

15. Apparatus for the control of mechanism as set out in claim 14 in which the said two cooperating valves are concentric sleeves with ports therein enclosing a chamber into which liquid under pressure can enter.

16. In apparatus for the control of mechanism the combination of a pressure sensitive capsule, a servomotor actuated by liquid under pressure and comprising a cylinder and piston, a valve controlling the flow of pressure liquid to the cylinder of the servomotor, means by which this valve is actuated by the said capsule, a movable member in which are the ports controlled by the said capsule-actuated valve, a hand lever with gearing through which this ported member is moved such movement altering the position of the ports in this member in relation to the said servomotor valve, mechanism operated by liquid under pressure, two separately rotatable concentric sleeve valves which co-operate and together control the flow of pressure liquid for operating this mechanism, means comprising gearing through which the first of these co-operating sleeve valves will be rotated by movement of the piston of the said servomotor, and means for rotating the second of the said co-operating sleeve valves through gearing from the said hand lever when this is moved to set the said ported member in relation to the said servomotor valve within it.

17. Apparatus for the control of mechanism as set out in claim 16 in which the valve actuated by the pressure sensitive capsule is a piston valve which is movable within a ported sleeve to which movement is imparted through gearing by the said hand lever thereby setting the ports in this sleeve in relation to the piston valve within it.

18. In apparatus for the control of mechanism the combination of a pressure sensitive capsule, a servomotor actuated by liquid under pressure and comprising a cylinder and piston, a piston valve controlling the flow of pressure liquid to the cylinder of the servomotor, means by which this valve is moved by the said capsule, a ported sleeve within which moves the said piston valve which controls the ports in this sleeve, a hand lever with gearing through which this ported sleeve is moved in the direction of its axis both in relation to the piston valve within it and with respect to ports in an enclosure casing, mechanism operated by liquid under pressure, a second servomotor which actuates a valve controlling the flow of pressure liquid to this mechanism, two concentric ported sleeve valves which are separately rotatable relatively and both rotatable in relation to ports in a casing around them, these valves which have within them a chamber into which liquid under pressure can enter co-operating and together controlling the flow of this pressure liquid to operate the said second servomotor, means comprising gearing through which the first of the said co-operating sleeve valves will be rotated by the movement of the piston of the said first servomotor, means for rotating the second of the said co-operating sleeve valves through gearing from the said hand lever when this is moved to set the said ported sleeve in relation to the said servomotor piston valve within it, and means by which the piston of the said first servomotor if it moves beyond a determined distance will impart movement to the said ported sleeve and will simultaneously rotate the second of the said co-operating sleeve valves.

FRANK BERNARD HALFORD.
PERCY JOHN WALLACE.